(12) United States Patent
Gibson

(10) Patent No.: US 9,644,706 B2
(45) Date of Patent: May 9, 2017

(54) BELT HAVING A MULTILAYER IMPREGNATED TEXTILE OVERLAY

(71) Applicant: ARNTZ BETEILIGUNGS GMBH & CO. KG, Hoexter (DE)

(72) Inventor: Daniel Pattie Gibson, Hoexter (DE)

(73) Assignee: Arntz Beteiligungs GmbH & Co. KG, Hoexter (DE)

( * ) Notice: Subject to any disclaimer, the term of this patent is extended or adjusted under 35 U.S.C. 154(b) by 371 days.

(21) Appl. No.: 14/366,703

(22) PCT Filed: Dec. 17, 2012

(86) PCT No.: PCT/EP2012/005191
§ 371 (c)(1),
(2) Date: Jun. 19, 2014

(87) PCT Pub. No.: WO2013/091808
PCT Pub. Date: Jun. 27, 2013

(65) Prior Publication Data
US 2014/0378255 A1  Dec. 25, 2014

(30) Foreign Application Priority Data
Dec. 20, 2011 (DE) .......... 10 2011 121 656

(51) Int. Cl.
*F16G 1/16* (2006.01)
*B29D 29/08* (2006.01)
(Continued)

(52) U.S. Cl.
CPC .............. *F16G 1/16* (2013.01); *B29D 29/08* (2013.01); *F16G 1/08* (2013.01); *F16G 1/10* (2013.01);
(Continued)

(58) Field of Classification Search
CPC ........ F16G 1/16; B29D 29/08; B29L 2029/00
(Continued)

(56) References Cited

U.S. PATENT DOCUMENTS 4,457,743 A * 7/1984 Robecchi .................. F16G 5/14
474/260
4,566,931 A    1/1986 Panoch et al.
(Continued)

FOREIGN PATENT DOCUMENTS

CN    1228104 A    9/1999
CN    1502019 A    6/2004
(Continued)

*Primary Examiner* — William E Dondero
*Assistant Examiner* — Mark K Buse
(74) *Attorney, Agent, or Firm* — Whitham, Curtis & Cook, P.C.

(57) ABSTRACT

A power transmission belt having a base made of polyurethane and a textile overlay includes a first coating of a first thermoplastic material on the surface of the textile overlay. The first coating forms an impregnation, which has a melting temperature from 80° C. to approximately 145° C., penetrates at least partially into the textile. A second thermoplastic material on the first coating has a higher melting point. The first and second coatings can be applied successively to the textile overlay before casting of the polyurethane or can be overlaid as individual films or as a multilayer film, and they may be applied to the textile overlay by heat and pressure. The coating acts to reduce abrasion and prevents the through passage of the belt polyurethane.

25 Claims, 2 Drawing Sheets

(51) Int. Cl.
*F16G 1/08* (2006.01)
*F16G 1/10* (2006.01)
*F16G 1/28* (2006.01)
*F16G 5/20* (2006.01)
*B29L 29/00* (2006.01)

(52) U.S. Cl.
CPC ............... *F16G 1/28* (2013.01); *F16G 5/20* (2013.01); *B29L 2029/00* (2013.01)

(58) Field of Classification Search
USPC .......................................................... 474/269
See application file for complete search history.

(56) References Cited

U.S. PATENT DOCUMENTS

| | | | |
|---|---|---|---|
| 5,698,650 | A | 12/1997 | Jourdain et al. |
| 6,296,588 | B1* | 10/2001 | Ciemniecki ............ B29D 29/08 474/268 |
| 6,465,074 | B1* | 10/2002 | FitzPatrick .......... D03D 1/0094 162/358.4 |
| 6,770,004 | B1* | 8/2004 | Lofgren .................... F16G 1/00 474/264 |
| 7,025,699 | B2* | 4/2006 | Beck ......................... F16G 1/08 156/137 |
| 2004/0214675 | A1 | 10/2004 | Beck |
| 2008/0132370 | A1* | 6/2008 | Goettsch ................. F16G 5/20 474/268 |
| 2008/0139709 | A1 | 6/2008 | Piccirilli et al. |
| 2010/0075793 | A1 | 3/2010 | Cretin et al. |
| 2010/0120566 | A1* | 5/2010 | Izu ............................ F16G 1/28 474/148 |
| 2011/0003659 | A1* | 1/2011 | Wu .......................... D02G 3/32 474/250 |
| 2014/0323257 | A1* | 10/2014 | Gibson .................... F16G 5/08 474/261 |

FOREIGN PATENT DOCUMENTS

| | | |
|---|---|---|
| DE | 24 62 458 B2 | 7/1975 |
| DE | 32 48 776 A1 | 7/1984 |
| DE | 600 13 996 T2 | 4/1999 |
| DE | 102 12 889 A1 | 10/2003 |
| DE | 10212889 A1 | 10/2003 |
| DE | 10 2006 025 562 A1 | 6/2006 |
| DE | 10 2008 055 497 A1 | 12/2008 |
| DE | 10 2010 017782 A1 | 11/2011 |
| EP | 1 154 171 A1 | 11/2001 |
| EP | 1 180 615 A2 | 2/2002 |
| EP | 1 696 150 A1 | 8/2006 |
| WO | 96/08318 A1 | 3/1996 |
| WO | 02084144 A1 | 10/2002 |
| WO | 03/031700 A1 | 4/2003 |
| WO | 2004/000535 A1 | 12/2003 |
| WO | 2005/080820 A1 | 9/2005 |
| WO | 2011138088 A1 | 11/2011 |

* cited by examiner

BELT HAVING A MULTILAYER IMPREGNATED TEXTILE OVERLAY

FIELD OF THE INVENTION

The invention relates to a power transmission belt with an elastic substructure of cast polyurethane and a power transmission zone constructed thereon and also with a textile overlay in contact with this power transmission zone, to more than one process for production thereof and to a corresponding, multilayeredly impregnated belt textile.

BACKGROUND

Textile coatings on belts, in particular toothed belts, are primarily designed to reduce abrasion and, in the case of toothed belts, to stop tearing at the tooth edges and tear propagation in the event of damage in the tooth outside edge.

Polyurethane belts are generally cast directly onto the textile overlay, so it is on the overlay that the polyurethane reacts, crosslinks and solidifies. In the process, it penetrates to at least some extent into the textile and therethrough. As the abrasion-resistant and optionally friction-reducing textile overlay then somewhat wears away during use, the belt polyurethane, which generally has a very high coefficient of friction, comes into direct contact with the power transmission or toothed disk, so there is an abrupt increase in the level of friction there. This is undesirable.

DE 10 2008 055 497 A1 discloses providing an adhesion promoter between the foundational body and the textile overlay of a drive belt in order to avoid excessively deep penetration of the vulcanizate into the textile overlay and to effect better chemical attachment to the textile. The adhesion promoter melts in the course of vulcanization and penetrates into the textile overlay while undergoing co-crosslinking. The process is unsuitable for polyurethane belts, since it prevents the inherently desirable mechanical intermeshing between the polyurethane and the textile and shortens the durability and/or maximum service life of the belt.

U.S. Pat. No. 6,296,588 B1 further discloses endowing the textile overlay of an endless belt with an additional layer of a high-melting thermoplastic. The additional level of abrasion control provided by this, however, only lasts until the thermoplastic on the surface has worn away in use. From that point on, friction is liable to increase very suddenly with the advent at the surface of polyurethane which, in the course of being used to cast the belt, has penetrated the through textile to the thermoplastic layer.

To rectify the increased friction, therefore, it has also already been proposed that the textile overlay be additionally rendered lubricious. This is frequently accomplished with PTFE which, however, tends to break and is too rapidly lost during use as the fibers rub against each other. Such textiles as are additionally rendered lubricious by means of PTFE are known, for example from WO 03/031700 A1 and US 2010/0120566 A1. The US 2010/0120566 A1 proposal is that the woven fabric comprising PTFE fibers should also incorporate low-melting thermoplastic fibers which melt in the event of thermal forcing and fix the PTFE fibers. Since this form of fixing surrounds the PTFE fibers, however, it simultaneously hinders the friction-ameliorating improvement.

SUMMARY

The problem addressed by the present invention is that of further developing a belt of the type referred to at the beginning so as to obtain a distinct improvement in service life whilst performance characteristics stay substantially the same across the service life. In particular, the abrasion resistance of the belt textile shall be enhanced and an increase in the coefficient of friction across the service life shall be avoided or minimized.

The abovementioned problem is solved in the power transmission belt of the present invention because the belt possesses a first coating of a first thermoplastic material on the exteriorly lying surface of the textile overlay, the first coating having at least partially penetrated into the textile to form an impregnation therein, wherein further a second coating of a second thermoplastic material is present on the first coating.

In a preferred embodiment, the melting temperature of the second thermoplastic material is higher than that of the first thermoplastic material and preferably remains below 150° C., while the first thermoplastic material has a melting temperature of from 80° C. to about 145° C. The melting point is determined using, for example, differential scanning calorimetry (DSC) at ambient pressure.

The impregnation due to the first coating also serves to form a barrier zone to the polyurethane penetrating from the other side of the textile during casting, while additionally, through reinforcement of the textile with an admixture material, producing a further degree of mechanical intermeshing between polyurethane and impregnated textile and finally to fix the fibers of the textile at the belt surface. The latter happens underneath the second coating, which is preferably thin and wears away rapidly in the course of use, or which, alternatively, can be peeled off before commissioning the belt, at a time when the coatings are mutually peelable.

The two-layered finish applied to the textile, wherein the first coating produces at least to some extent an impregnation within the textile structure, has the effect that the second coating, which as a coating with a thermoplastic material forms an uninterrupted coating surface, absolutely prevents the polyurethane applied to the textile overlay by casting from completely penetrating the textile overlay or even arriving at its outer surface to form a film there. Instead, the cast polyurethane is retained in the impregnated zone and advances from there to the outer surface of the textile overlay at most, without completely penetrating through the latter or getting to the surface outside.

The second coating itself possesses a coefficient of friction which endows the belt with good performance characteristics and is always distinctly below the coefficient of friction of a polyurethane. The coefficient of (sliding) friction of the second coating is preferably below 0.45 and always preferably below 0.3. It is not disadvantageous for the second coating to be thin and to be worn away relatively quickly in use by abrasion.

After this second coating has worn away, the abrasion-resistant textile comes to the belt surface, primarily with its zone impregnated with the first coating. Although cast belt polyurethane may have penetrated as far as into this zone, this will only be the case to a relatively minor extent, so polyurethane's high coefficient of friction can be rectified by a low coefficient of friction on the part of the thermoplastic material of the second coating and/or friction-reducing properties on the part of the abrasion-resistant textile of the textile overlay.

Accordingly, the coefficient of friction of the second coating is preferably likewise below 0.45 but more preferably below 0.3.

Optionally, a friction-reducing additive may modify the thermoplastic materials not only of the first coating but also of the second coating. The friction-reducing additive may be in particular polyolefin fluorides such as preferably PTFE, polyvinyl chloride, graphite, silicone, molybdenum disulfite or other known friction-reducing additives, or mixtures of these additives. Friction-reducing additives are known to a person skilled in the art. The further additization of thermoplastic materials which is always possible need not be further explicated here.

Preferably, the thermoplastic material of the first coating, i.e., the first thermoplastic material, is a copolyamide.

Copolyamides herein refers not only to polymers polymerized from more than two different types of monomer that polymerize to form polyamide but also mixtures of two or more such polymers. The copolyamides in question may in principle consist of one or more diamines in combination with one or more dicarboxylic acids or lactams, optionally in combination with one or more aminocarboxylic acids, other amino-substituted carboxylic acids, etc. The following are mentioned merely by way of example: caprolactam/hexamethylene-diamine/adipic acid; hexamethylenediamine/adipic acid/sebacic acid; hexamethylenediamine/tetramethylene-diamine/adipic acid; hexamethylenediamine/tetra-methylenediamine/azelaic acid; and also products of dicarboxylic acids, diamines and alpha-aminocarboxylic acids and/or lactams with aliphatic, cycloaliphatic or aromatic amines and/or carboxylic acid, preferably each with 6 to 20 carbon atoms per monomer unit.

Copolyamides further comprehend mixtures of two or more of the aforementioned copolyamides.

Copolyamides further comprehend copolymers comprising polyamide units and further polymerizable units and also mixtures of copolyamides as described above with other polymers that each have a polyamide content of at least 50 wt %.

Specific copolyamides that intromelt efficiently into manufactured-fiber textiles and are suitable for the invention are referred to in DE 32 48 776 A1 and DE 102 12 889 A1 for example.

The melting point of the thermoplastic material of the first coating is preferably between 80 and 145° C., more preferably between 90 and 145° C., more preferably between 90 and 135° C., more preferably between 100 and 135° C. and especially between 100 and 130° C.

The thermoplastic material of the first coating is present in the textile overlay of the power transmission belt according to the present invention in an at least very largely or completely intromelted state which, as will be more particularly described hereinbelow, is brought about by special production processes and/or pretreatment steps in relation to the textile. The surface of the textile surface facing the adjacent polyurethane is preferably left virtually free from the first thermoplastic material (the impregnating material). The thermoplastic material of the first coating is preferably present in the textile overlay at a basis weight of up 200 g/m², preferably up to 100 g/m².

The second thermoplastic material for the second coating preferably has a melting point below 150° C., more preferably not more than 145° C. and in particular up to 140° C., and may be for example a polyolefin, such as a polyethylene or polypropylene, alternatively a polyamide or a polyester. Any comparatively high-melting thermoplastic material is suitable provided it forms an uninterrupted surface, i.e., impervious to cast polyurethane, and has a relatively low coefficient of friction, preferably as mentioned above in the region below 0.45. Suitable materials are in particular high-density polyethylenes and other crystalline or semicrystalline homopolymeric polyolefins.

In a particularly preferred embodiment, a third layer may be disposed as interlayer between the first coating and the second coating of the textile overlay. Preferably, an adhesion promoter layer is between the first and second thermoplastic materials.

The interlayer may preferably be an adhesion promoter layer to effect adhesion promotion between the first coating and the second coating. When the first coating is a copolyamide and the second coating is a polyolefin, in particular HDPE, the interlayer may consist of LDPE or modified LDPE for example. Suitable adhesion promoters for HDPE are known to a person skilled in the art. Modified LDPE may be modified with maleic acid.

Alternatively, a layer which is peelable with regard to copolyamide or HDPE can be provided instead of the adhesion promoter layer.

The second coating has a thickness of up to 200 µm, preferably up to 100 µm. It is preferably thin and in a particularly preferred embodiment possesses a thickness of preferably 10 to 50 µm. These preferred embodiments provide that the thin second coatings stay on the power transmission belt to be worn away rapidly, while in other embodiments the thick second coatings are preferably removed, for example peeled off, before use.

The textile of the textile overlay can be a woven fabric, a loop-formingly knitted fabric, a loop-drawingly knitted fabric or a nonwoven fabric, preference being given to a woven fabric. The fabrics or textiles in question can be conventional belt textiles as known to a person skilled in the art. Preference is given to textiles comprising manufactured fibers or a manufactured-fiber blend, the textile overlay consisting of or containing these fibers. Particularly preferred manufactured-fiber materials consist of polyamide or polyester or contain such fibers, examples being nylon-6,6, meta-aramid, para-aramid, nylon-4,6, and may be endowed with friction-reducing materials, such as polytetrafluoroethylene (PTFE). It is preferable here for PTFE threads to be co-incorporated in the textile, as shown in WO 03/031700 A1 for example.

The use of a belt textile containing PTFE threads or filaments in the power transmission belt of the invention is particularly advantageous because the impregnation zone of the first coating combines with the PTFE-containing textile to create a particularly high level of abrasion resistance. True, small amounts of polyurethane may have advanced as far as into this zone. However, the disadvantageous effect on the coefficient of friction is more than rectified by the optionally friction-reducingly modified thermoplastic material of the first coating in combination with the polytetrafluoroethylene fibers from the textile. It is further the case that the good fixing of the PTFE fibers in this zone has the effect—under agency of the thermoplastic impregnation and optionally of the additionally solidifying polyurethane—that the PTFE fibers are fully able to develop their friction-reducing effect across the full service life—without being lost by breakage or internal friction. The advantages obtained as a result are astonishing.

The power transmission belt can in principle correspond to any known type and be in particular a flat belt, a V-belt or a toothed belt. Toothed belts are particularly preferred, since the advantages of the belt textile are particularly apparent here.

The invention further encompasses processes for producing the multilayered textile finish.

In a first aspect of the invention, the casting of the polyurethane onto the textile overlay is preceded by the succession application of first and second castings to a surface of the textile overlay in superposition thereon, wherein at least the first coating is thermally fixed, so the first coating penetrates at least partially, i.e., preferably to not less than 50% of its weight, into the textile overlay and in that the polyurethane is cast in a further step onto the opposite surface of the textile overlay.

Otherwise the belt is produced in a known manner. The textile overlay prepared using the process is inverted and placed into an appropriate mold, so the doubly coated side faces down in the mold, while the non-impregnated side faces up. The polyurethane is cast onto the non-impregnated side of the textile overlay and cures there in the desired shape. The polyurethane of the power transmission zone may as usual form the polyurethane of the entire substructure. It may simultaneously bind in the tensile members unless a separate mixture is provided therefor. The belt is then further built up as usual and may optionally possess a second cover on the belt spine.

In which form the thermoplastic materials are applied to the textile overlay, specifically to the later outside surface, is initially freely choosable. The thermoplastic materials may be dissolved in solvents, blade coated or brushed on or be scattered on in the form of a powder or granular material and thermally fixed. However, these procedures are not preferred.

What is preferred is for the first and second coatings to be applied to and fixed on the textile overlay in the form of foils. This is generally accomplished by means of heat in that the foil for the first coating melts completely or insipiently and penetrates as melt into the textile structure of the textile overlay. The application of the coatings can be augmented using pressure. It is possible here to operate with a comparatively high pressure at a comparatively low temperature or at somewhat higher temperature and lower pressure. It is similarly possible to augment the fixing with underpressure from the bottom side of the textile.

In a preferred embodiment, it is initially the first coating which is applied, preferably in the form of a foil, and fixed. The second coating is then applied to the first coating, in the form of a further foil. The second foil can be fixed on the first foil using adhesion promoter. Preferably, the second foil can consist of the foil for the second coating and an adhesion promoter layer, in which case this second two-layered foil is then placed with the adhesion promoter side on the first coating and thermally fixed there.

In a further aspect of the invention, the process is characterized in that an at least two-layered foil is applied to a surface of textile overlay before the polyurethane casting, wherein a first layer of this foil faces the textile and possesses a melting point of from 80° C. to about 145'C. and a second layer of this foil faces away from the textile and possesses a higher melting point than the first one, and in that the foil is thermally fixed on the textile overlay, so the foil's first layer melts at least partially—preferably at not less than 50% of its weight—into the textile, while the layer covers the impregnated textile. The second layer does not melt into the textile to any significant extent, if at all. The properties of the layers can be as already described above for the coatings.

The prepared textile is further used as in the process already described above, i.e., the polyurethane is cast onto it from the uncoated side.

The multilayered foil as per the last-mentioned process aspect is preferably wholly or partly provided, and applied to the textile overlay, in the form of a coextruded multilayered foil. In the case of a three-layered foil, two or three layers may be coextruded layers.

When the multilayered foil is three layered, it preferably possesses an adhesion promoter layer as an interlayer between the first and second layers. The adhesion promoter layer has already been described above.

A particularly preferred embodiment provides that the second layer is peelable from the first one. The second layer or two or more exteriorly lying layers is/are then peeled off the belt after casting the polyurethane to leave behind the first layer as an impregnating coating on the textile overlay. The second coating has the chief purpose of preventing complete penetration of the polyurethane to the surface of the textile overlay through the first impregnation. After this purpose has been served and the belt polyurethane has cured, the second layer can be removed. The advantages of the impregnation with the first coating have already been described above.

The invention further encompasses a belt textile, in particular a toothed belt textile, for use as textile overlay in a power transmission belt of the present invention.

The belt textile of the present invention is a manufactured-fiber textile which optionally contains admixtures of other fibers, for example natural fibers such as cotton fibers, in which case the admixtures preferably sum to not more than 40% by volume. This belt textile of the present invention bears an at least two-layered coating with a first thermoplastic material which is first, possesses a melting point from 80° C. to about 145° C., preferably from 90° C. to about 145° C., more preferably from 90° C. to about 135° C., especially 100 to 130° C., and has at least partially penetrated into the textile, and a second thermoplastic material which is at the belt surface and has a melting point that is higher than that of the first thermoplastic material, and is preferably below 150° C.

The properties of the two coatings and corresponding materials have already been described above.

DESCRIPTION OF THE DRAWINGS

The invention will now be more particularly described with reference to an exemplary embodiment depicted in the drawing, in which.

DESCRIPTION

Figure 1:
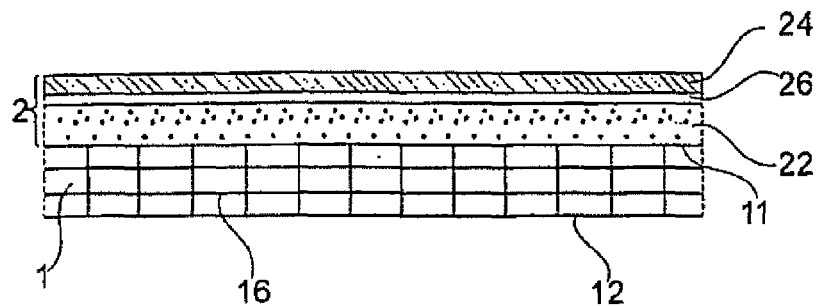
FIG. 1 shows a textile overlay with applied three-layered foil of thermoplastic materials.

FIG. 1 shows an in-principle sketch of a cross section through a textile overlay (1) onto which there has been placed a three-layered foil (2) comprising the foil layers (22, 24, 26). Facing the textile overlay (1) and lying on its first surface (11), the later outer surface of the power transmission belt, there is situated a first layer (22) which is formed of a first thermoplastic material and which will, after fixing of the multilayered foil (2), form the first coating having an impregnation zone as more particularly depicted in FIG. 2. The second layer (24) is a thermoplastic covering layer which is uninterrupted even after fixing of the multilayered foil, and the layer (26) is an interlayer, in this instance an adhesion promoter layer with regard to the copolyamide of layer (22), which permits peeling off the layer (24).

Figure 2:
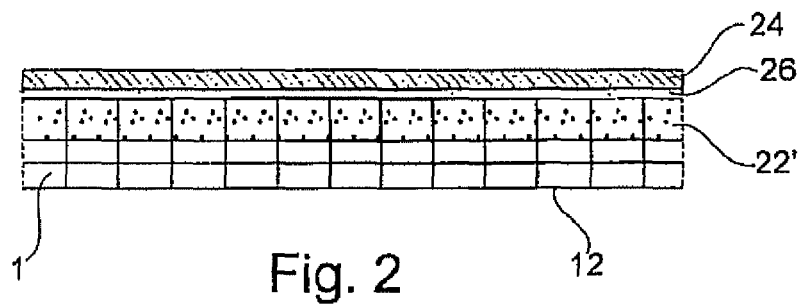
FIG. 2 shows the textile overlay of FIG. 1 with molten multilayered foil and intromelted first layer.

FIG. 2 shows the exemplary embodiment depicted in FIG. 1, after application of heat and optionally pressure to the surface of the multilayered foil. The first layer (22) melts into the textile overlay (1), so the thermoplastic material (22') of this first layer spreads into a surface zone of the textile overlay (1) to form an impregnation zone. This impregnation zone does not reach as far as the opposite surface (12) of the textile overlay (1).

Figure 3:
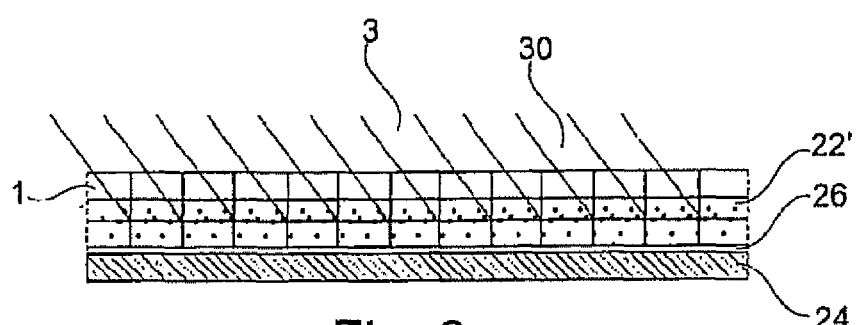
FIG. 3 shows the textile overlay of FIG. 2, inverted, with cast polyurethane thereon.

FIG. 3 shows the example of FIG. 2 after inversion. And after polyurethane (30) has been cast on to form in adjacency to the textile overlay (1) a power transmission zone (3) of a power transmission belt not further depicted.

The belt polyurethane penetrates the textile overlay (1) and substantially also the impregnation zone where the textile has been impregnated with the first thermoplastic material (22'). The layers (26 and 24), however, prevent the polyurethane from penetrating fully through the textile overlay (1) or that it might even spread to its surface. When the multilayered foil (2) was pressed onto the textile overlay (1) under pressure, an additional surficial compaction of the textile material of the textile overlay (1) may have taken place, which additionally serves to keep the polyurethane back and provides a polyurethane-free compacted surface.

Figure 4:
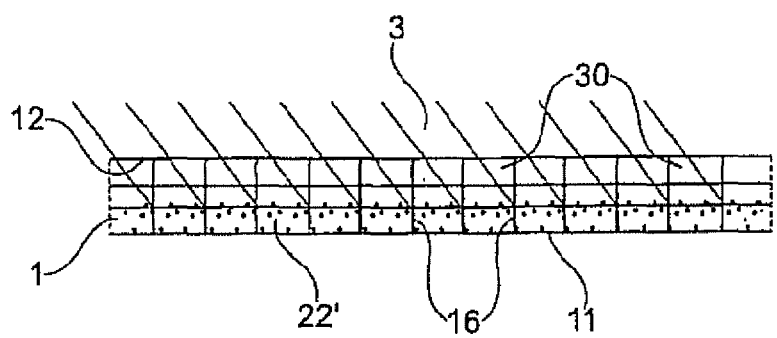
FIG. 4 shows the textile overlay of FIG. 2 with cast polyurethane thereon after the two outer layers of the multilayered foil have been peeled off, FIGS. 5a) to 5c) show a schematic depiction of standard belts whereon the invention can be actualized; a) V-belt; b) toothed belt; c) band belt.

The layers (24 and 26) are removed in the next step. FIG. 4 shows the textile overlay (1) in contact with the power transmission zone (3) of the undepicted power transmission belt.

The textile overlay (1) is penetrated in the boundary region with polyurethane (3) which, however, does not extend completely to the outer surface (11) to which the layers (26 and 24) were surficially bound beforehand. The impregnation zone where the first thermoplastic material (22') is situated is partially penetrated with polyurethane. The thermoplastic material (22') serves to fix the fibers (16) of the woven textile fabric across the full scope of the impregnation zone.

Figure 5:
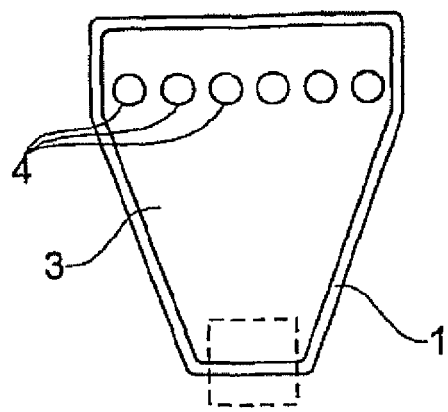
Figure 5:
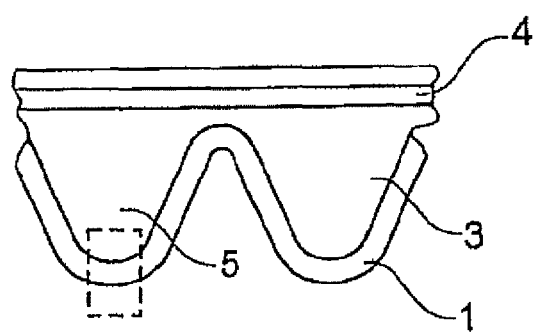
Figure 5:
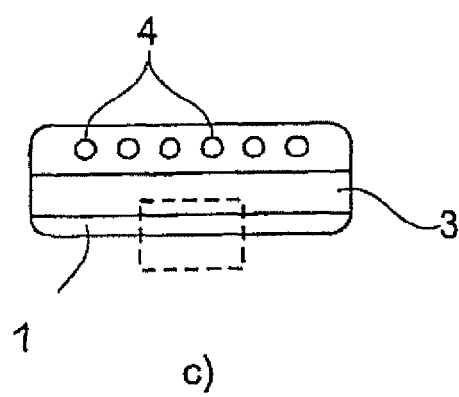

FIGS. 5a) to 5c) show the invention in use with standard belts. The textile overlay 1 is in each case covering the power transmission zones 3 of the belt substructures. What is also shown is the belt-typical arrangement of strength members 4. FIG. 5a) shows a V-belt with complete textile sheathing. The textile overlay 1 encloses the belt completely. FIG. 5b) shows a toothed belt having transversely disposed teeth 5 and longitudinally extending strength members 4. In this case, the textile overlay 1 covers the entire toothed areas including valleys, squirts and flanks. FIG. 5c) shows a flat belt whose textile overlay 1 is confined to the inside area. The broken-lined sectional regions in each of FIGS. 5a) to 5c) correspond to a textile overlay with polyurethane and one or more coating layers as shown in FIGS. 3 and 4.

In practice, fiber fixing results in a substantial lengthening of the service lives of the belt. The properties of the belt accordingly remain unchanged for a long period.

Material-Related Particulars

A toothed polyurethane belt was finished as follows:
Textile Overlay:
 warp and weft in nylon-6,6; weight 275 g/m$^2$;
 2×2 twill weave construction; textile extensibility:
 80% at 20 newton loading (width of sample specimen 25 mm)

Foil Overlay, Multilayered:
 from the textile overlay superposed in this order:
 1. copolyamide foil, 50 μm, melting point: 110-120° C.;
 2. modified PE, 100 μm;
 3. HDPE, 100 μm.

What is claimed is:

1. A power transmission belt, comprising:
a power transmission zone of polyurethane,
a textile overlay having an interior and an exterior surface, wherein the polyurethane of the power transmission zone extends into the interior of the textile overlay,
a first coating of a first thermoplastic material having a melting temperature of from 80° C. to about 145° C. on the exterior surface of the textile overlay, wherein the first coating at least partly penetrates into the textile overlay and forms an impregnation in the textile overlay, and wherein the first thermoplastic material is a copolyamide, and
a second coating of a second thermoplastic material on the first coating, wherein a melting temperature of the second thermoplastic material is higher than that of the first thermoplastic material.

2. The power transmission belt as claimed in claim 1, further comprising a friction-reducing additive which modifies one or more of the first coating and the or second coating.

3. The power transmission belt as claimed in claim 1, further comprising an interlayer between the first and second coatings.

4. The power transmission belt of claim 3 wherein the interlayer is an adhesion promoting layer.

5. The power transmission belt of claim 3 wherein the interlayer is a peelable layer.

6. The power transmission belt as claimed in claim 1, wherein the second coating has a thickness of up to 300 m.

7. The power transmission belt as claimed in claim 1, wherein the second coating is peelable from the first coating.

8. The power transmission belt as claimed in claim 1, wherein the belt is configured as a toothed belt.

9. The power transmission belt of claim 1 wherein the first thermoplastic material is selected from the group consisting of caprolactam/hexamethylenediamine/adipic acid, hexamethylene-diamine/adipic acid/sebacic acid, hexamethylene-diamine/tetramethylene-diamine/adipic acid, and hexamethylenediamine/tetrametnylenediamine/azelaic acid.

10. The power transmission belt of claim 1 configured as a toothed belt.

11. A process for producing a power transmission belt having a power transmission zone of polyurethane extending into an interior of a textile overlay, comprising:
application of first and second coatings to a surface of the textile overlay in superposition thereon, wherein at least the first coating is thermally fixed so the first coating penetrates at least partially into the textile overlay and impregnates the surface of the textile overlay, wherein the first coating is a thermoplastic copolyamide, and wherein the second coating is a second thermoplastic material, and then
casting polyurethane onto an opposite surface of the textile overlay.

12. The process as claimed in claim 11, wherein the first and second coatings are applied and fixed on the textile overlay in the application step as foils.

13. The process of claim 12 wherein application of the first and second coatings occurs simultaneously.

14. The process as claimed in claim 11, further comprising fixing the second coating to the first coating using an adhesion promoter.

15. The A process as claimed in claim 11 wherein an at least two-layered foil is applied in said application step to the surface of textile overlay, wherein a first layer of foil faces the textile overlay and includes the thermoplastic copolyamide, and wherein the thermoplastic copolyamide has a melting point of from 80° C. to about 145° C., and wherein a second layer of foil faces away from the textile overlay and includes the second thermoplastic material, and wherein the second thermoplastic material has a higher melting point than the thermoplastic polyamide, and wherein the application step is performed by thermally fixing the at least two-layered foil on the textile overlay so that the first layer of the at least two-layered foil melts at least partially into and impregnates the textile overlay, while the second layer of the at least two-layered foil covers the impregnated textile overlay.

16. The process as claimed in claim 15, wherein the first and second layers of the at least two-layered foil are provided and applied to the textile overlay as a coextruded multilayered foil.

17. The process as claimed in claim 16 wherein the multilayered foil is three layered and includes an adhesion promoter layer between the first and second layers of the at least two layered foil as an interlayer.

18. The process as claimed in claim 11, further comprising the step of peeling off the second coating from the first coating after the step of casting polyurethane on the textile overlay to produce a belt with a first coating impregnating at textile overlay and cast polyurethane on an opposite surface of the textile overlay.

19. The process as claimed in claim 11, wherein the thermoplastic copolyamide in the first coating has a melting temperature of from 80° C. to about 145° C., and wherein the second thermoplastic material of the second coating has a higher melting temperature than the thermoplastic copolyamide of the first coating.

20. The process as claimed in claim 19 wherein the thermoplastic copolyamide is selected from the group consisting of caprolactam/hexamethylenediamine/adipic acid, hexamethylene-diamine/adipic acid/sebacic acid, hexamethylenediamine/tetramethylene-diamine/adipic acid, and hexamethylenediamine/tetrametnylenediamine/azelaic acid.

21. A belt textile for use as textile overlay in a power transmission belt, comprising:
a textile overlay, and
an at least two-layered coating on a surface and impregnating the textile overlay, wherein the at least two-layered coating comprises a first layer with a first thermoplastic material which has a melting point from 80° C. to about 145° C. and has at least partially penetrated into the textile overlay and wherein the first thermoplastic material is a copolyamide, and wherein the at least two-layered coating comprises a second layer which is a second thermoplastic material which has a melting point that is higher than that of the first thermoplastic material.

22. The belt textile as claimed in claim 21, wherein the first thermoplastic material comprises a friction-reducing additive.

23. The belt textile as claimed in claim 21, wherein the at least two-layered coating comprises a third layer between the first and second layers which is an adhesion promoter layer.

24. The belt textile as claimed in claim 21, wherein at least the second layer of the at least two-layered coating is peelable from the first layer.

25. The belt textile as claimed in claim 21 wherein the at least two layered coating includes other fibers different from the textile overlay in admixture.

* * * * *